United States Patent
Kleinbach (10) Patent No.: US 12,472,568 B2
(45) Date of Patent: Nov. 18, 2025

(54) METHOD FOR GEAR SHAPING A PERIODIC STRUCTURE, IN PARTICULAR A TOOTHING, AND SHAPING MACHINE DESIGNED THEREFOR

(71) Applicant: GLEASON-PFAUTER MASCHINENFABRIK GMBH, Ludwigsburg (DE)

(72) Inventor: Kurt Kleinbach, Beilstein (DE)

(73) Assignee: Gleason-Pfauter Maschinenfabrik GmbH, Ludwigsburg (DE)

( * ) Notice: Subject to any disclaimer, the term of this patent is extended or adjusted under 35 U.S.C. 154(b) by 930 days.

(21) Appl. No.: 17/595,566

(22) PCT Filed: Jun. 4, 2020

(86) PCT No.: PCT/EP2020/065428
§ 371 (c)(1),
(2) Date: Nov. 19, 2021

(87) PCT Pub. No.: WO2020/254114
PCT Pub. Date: Dec. 24, 2020

(65) Prior Publication Data
US 2022/0219253 A1     Jul. 14, 2022

(30) Foreign Application Priority Data
Jun. 17, 2019 (DE) .................... 10 2019 004 299.9

(51) Int. Cl.
*B23F 1/04* (2006.01)
*B23F 5/16* (2006.01)

(52) U.S. Cl.
CPC .................. *B23F 1/04* (2013.01); *B23F 5/16* (2013.01); *Y10T 409/105247* (2015.01); *Y10T 409/10795* (2015.01); *Y10T 409/108745* (2015.01)

(58) Field of Classification Search
CPC . Y10T 409/105247; Y10T 409/106519; B23F 5/12; B23F 5/16; B23F 1/04
(Continued)

(56) References Cited

U.S. PATENT DOCUMENTS 9,868,169 B2   1/2018   Kikuchi et al.
2002/0081163 A1*   6/2002   Courtney .................. B23F 5/16
                                               407/30
(Continued)

FOREIGN PATENT DOCUMENTS

DE           1627371 A      4/1970
DE    102006052474 A1    5/2008
(Continued)

OTHER PUBLICATIONS

International Search Report and Written Opinion for PCT/EP2020/065428, ISA/EPO, Sep. 10, 2020, 13 pgs.
(Continued)

*Primary Examiner* — Erica E Cadugan
(74) *Attorney, Agent, or Firm* — Robert L. McDowell (57) ABSTRACT

The invention relates to a method for gear shaping a periodic structure, in particular a toothing on a workpiece, in which method the workpiece, continuously rotating about its axis of rotation, is brought into material-removing machining engagement with a toothed shaping tool which rotates about its axis of rotation in rolling contact with the workpiece rotation. After a working stroke, the shaping tool is lifted off from the workpiece in a lifting direction and, after a subsequent return stroke, the shaping tool in the lifted state is returned to the workpiece again for the next working stroke. In the return stroke, a deflection movement of the shaping tool away from the incoming flank of the workpiece and transversely to the lifting direction is superimposed on the rolling contact.

14 Claims, 5 Drawing Sheets

(58) Field of Classification Search
USPC .................................................. 409/34, 42
See application file for complete search history.

(56) References Cited

U.S. PATENT DOCUMENTS

| | | | |
|---|---|---|---|
| 2008/0112770 A1 | 5/2008 | Liebherr-Verzahntechnik | |
| 2010/0290852 A1 | 11/2010 | Koch et al. | |
| 2011/0262239 A1* | 10/2011 | Tokawa | B23F 5/16 409/34 |

FOREIGN PATENT DOCUMENTS

| | | |
|---|---|---|
| DE | 102012016515 A1 | 2/2014 |
| EP | 2368660 A1 | 9/2011 |
| GB | 1182668 A | 3/1970 |

OTHER PUBLICATIONS

German Patent and Trademark Office Search Report for DE 102019004299.9, Apr. 6, 2020, 10 pgs.
Thomas Bausch et al, "Innovative Zahnradproduktion," 3rd Edition, p. 281 in Fig. 7.1-1.

* cited by examiner

METHOD FOR GEAR SHAPING A PERIODIC STRUCTURE, IN PARTICULAR A TOOTHING, AND SHAPING MACHINE DESIGNED THEREFOR

The invention relates to a method for gear shaping a periodic structure, in particular a toothing on a workpiece, in which method the workpiece, continuously rotating about its axis of rotation, is brought into material-removing machining engagement with a toothed shaping tool which rotates about its axis of rotation in rolling contact with the workpiece rotation, and, after a working stroke, the shaping tool is lifted off from the workpiece in a lifting direction and, after a subsequent return stroke, the shaping tool in the lifted state is returned to the workpiece again for the next working stroke, as well as to a gear shaping machine controlled for this purpose.

Gear shaping is a technology for producing toothings; this technology has been known for a long time. It is a cutting method in which the main cutting movement is implemented by linear oscillation of the tool. The machining removal of the workpiece material takes place only in the so-called working stroke, the return stroke takes place in the lifted state to avoid return stroke strips. The method principle of gear shaping is described, for example, in Thomas Bausch et al, "Innovative Zahnradproduktion," 3rd Edition, p. 281 in FIG. 7.1-1, which is otherwise referred to with regard to its basic technology. For example, the rolling contact is simply the rotational movement of the tool and workpiece that is coordinated with one another for the rolling engagement; in the case of the machining of helical toothings, a so-called screw guidance is required, which guidance can be implemented in a CNC controlled manner via an additional rotation of the tool adapted to the stroke movement in order to maintain the rolling machining engagement during an axial movement (electronic screw guidance or simply electronic incline). For the purposes of this application, the screw guidance required for machining helical toothings is part of the rolling contact.

An important advantage of gear shaping over other methods such as gear hobbing is that it can be used more universally, even for certain workpiece geometries such as internal toothings or for workpieces with shoulders connected to the gearing, for which gear hobbing is little or not at all suitable.

Between the working stroke and the return stroke, the tool is usually not lifted off to such an extent that the tool teeth radially move completely out of the tooth gaps of the tool, but it is rather lifted off with a sufficient radial lifting distance to avoid collisions in the return stroke (return stroke strips).

In typical gear shaping machines, the lifting direction corresponds to the direction of lifting brought about, for example, by a lifting cam, and usually also corresponds to the radial infeed axis of the machine. In the case of gears that are critical with regard to the risk of collision, especially internal toothings, the effective lifting direction (corresponding to a lifting angle in a plane orthogonal to the stroke direction) can also be changed by generating a by means of a column side offset or rotation-caused tangential lifting component of the radial machine axis lifting to create a new lifting vector (lifting direction) so that the tool path takes place in the return stroke with the set tangential offset. This is disclosed in EP 2 368 660 A1.

US 2010/0290852 A1, also relating to gear shaping, makes the continuous tool spindle rotation responsible for an interference problem with the workpiece and suggests a discontinuous (timed stepped) tool rotation.

The invention is based on the object of further improving a method of the type mentioned at the outset, in particular with regard to an integration of a collision-free tool path into the overall concept of the method.

From a point of view of process engineering, this object is achieved by a development of the method of the type mentioned at the outset, which is substantially characterized in that a deflection movement of the shaping tool running transversely to the lifting direction away from the incoming flank of the workpiece is superimposed on the rolling contact in the return stroke. According to the invention, the return stroke movement of the shaping tool is thus modified, utilizing in particular the knowledge that the greatest risk of collision occurs in the region of the transition at the end of the return stroke, where uncut material is still present at maximum amounts when viewed relatively. The deflection movement, which is inevitably an approach movement with regard to the other opposite flank, thus takes place in a manner that matches the return stroke with less disruptive influence of the other flank of the tooth gap penetrated by a shaping wheel tooth in the working stroke.

In a preferred embodiment, it is provided that the deflection movement is brought about by an additional rotation of the shaping tool. This means that any separately provided additional machine axes can be dispensed with and the workpiece rotation can also be left unchanged. In the tool rotation, the superimposed rolling contact (possibly including an electronic incline when cutting helical toothings) and the deflection movement generated by the additional rotation are combined. With regard to a reference system which rotates only the rolling contact with possibly an electronic incline, a tool rotational position reference (for example the lowest point of the working shaping wheel tooth) moves rotationally transversely to the stroke direction and transversely to the lifting direction.

In a further preferred embodiment of the method, the deflection movement is carried out over a predominant part of the return stroke. In this way, the available period of time becomes longer, and a disruptive approach to the opposing flank can be appropriately shifted to higher return stroke levels.

In this context, it is particularly preferably provided that the deflection movement is controlled with respect to the rolling contact relative to an offset, in particular the offset of the angle of rotation, which offset steadily builds up in the return stroke. Such an offset is therefore not already maximally available at the beginning of the return stroke, but only builds up in the return stroke.

In this context, it is particularly preferably provided that the maximum offset is more at the end than at the beginning of the return stroke, preferably closer to the end than in the center of the stroke, in particular the maximum offset can be at the end of the return stroke, or, depending on the optional phase shift, between the linear oscillation and the lifting, at the transition in which the lowest tool point of the working shaping tooth is located axially in the stroke direction just above the upper toothing edge.

In a further preferred embodiment of the method, the deflection movement is controlled at a ratio of the closest distance between the workpiece and the shaping tool, which ratio is in the interval [1/8; 8], preferably in the interval [1/5; 5], in particular in the interval [1/3; 3] on the incoming flank relative to the ratio on the opposite flank. In simple words, the risk of collision on both flanks is thus kept under constant symmetry.

A further advantage of the design options provided by the method according to the invention lies in a reduction in the otherwise required lifting amount of the lifting movement, in particular its radial component predetermined by a machine axis. Thus, it is preferably provided that the lifting amount is set lower than a first lifting reference, during the setting of which the shaping tool would lie outside a safety distance for return stroke strips without the deflection movement. The standard value of the order of magnitude of 0.05 applies here as the safety margin. In this way, the machine can have a lower-vibration design.

In addition, it can preferably be provided that the lifting movement and the deflection movement are coordinated with one another with regard to minimizing the lifting amount. This can be viewed and optimized, for example, through advance simulation of collision-indicating penetration curves of the movements in the return stroke, in particular through an iterative determination. For this purpose, the customary safety margins are adhered to.

For example, the lifting amount could be in a range that is greater than R2+p(R1−R2) and less than R2+q(R1−R2), where R1 is the first lifting reference and R2 is a second lifting reference, at which, despite the deflection movement, would just result in the return stroke strip, and p is ≥0.1, preferably ≥0.2, and q is <0.9, preferably <0.8, in particular <0.7.

A further advantage of the method according to the invention are greater design options due to the collision risk reduction according to the invention, also with regard to the accelerations occurring in the tool path. Thus, it is preferably provided that the change of the lifting component to the axial component of the tool path takes place without bending pressure.

Using electronic CNC control of the crank drive, the return stroke can also be accelerated compared to the working stroke in order to reduce the total time for a stroke cycle, the rolling contact being adapted accordingly for the accelerated return stroke.

A plurality of strokes per division of the workpiece toothing is preferably carried out, i.e. the workpiece rotation takes place comparatively slowly compared to the stroke movement. At least four, more preferably at least six, in particular at least eight strokes are preferably carried out before the workpiece rotation has been rotated further by a total of one division.

In a further preferred embodiment, the return movement takes place with a delay compared to the lifting movement or a minimum reset, for example by an overflow which is wider than the required upper overflow. This leaves more time for the reversal of the deflection movement, which is necessary for restoring before the next working stroke, or the reduction of the built-up offset in the return movement, which movement is already exposed to high accelerations by passing through the upper dead center, so that the correct coupling conditions are achieved more smoothly and with satisfactory precision.

If there is already a risk of collision during the lifting movement, provision can also be made to change the effective lifting direction during lifting by means of a superimposition movement running transversely to the machine axis direction causing the lifting and/or by means of off-center machining (column side offset), preferably also by means of an additional tool rotation. In this case, however, it is preferred that the predominant component of the total offset that has been built up is not built up until the return stroke.

In principle, the invention is suitable for various machine-side implementations of the cyclic tool path, but it is preferably used in a variant in which a lifting cam is used in a shaping head with a crank drive.

A control program resulting in the execution of the method according to one of the aforementioned aspects is also placed under protection by the invention, as is a gear shaping machine with a controller which controls this gear shaping machine for executing a method according to one of the aforementioned aspects. The advantages of the machine according to the invention result from the advantages of the method according to the invention.

A disk cutting wheel is preferably used as the shaping tool, but depending on the workpiece configuration, bell cutting wheels, shank cutting wheels, or hollow bell cutting wheels can also be used.

With regard to the infeed strategy, the invention is not subject to any particular restrictions; for example, a radial infeed with roller feed could be selected, or a spiral method with degressive radial infeed, or other types of infeed. In terms of machine technology, the electronic inclined guidance and, preferably, the deflection movement are implemented by means of a CNC-controlled direct drive.

Further features, details, and advantages of the invention can be found in the following description with reference to the accompanying drawings, in which.

Figure 1:
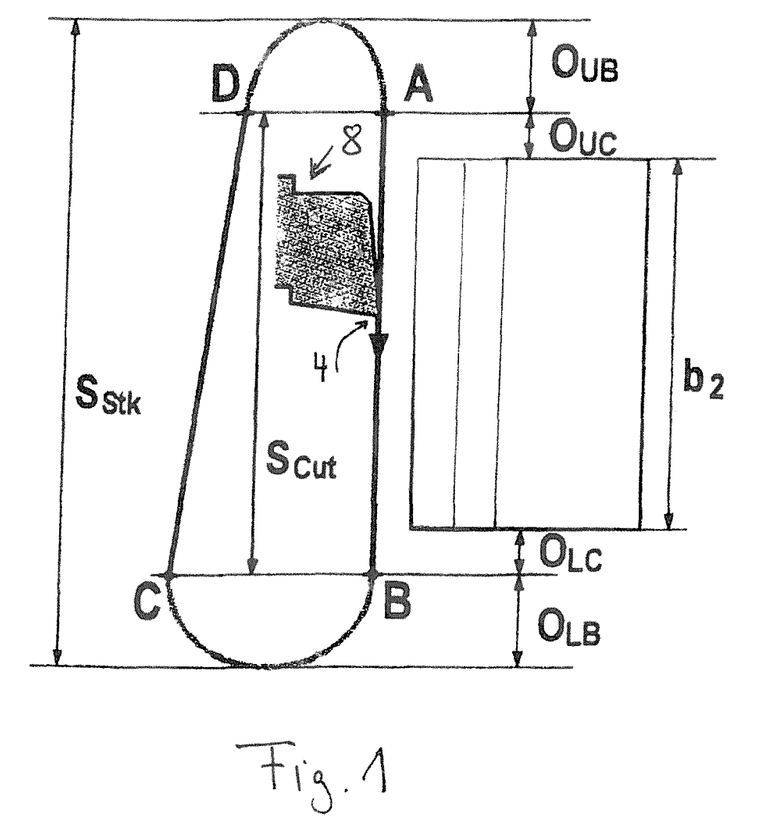
FIG. 1 shows a tool path during gear shaping,
FIG. 2 schematically shows a lifting cam profile.

FIG. 1 shows the tool path during the shaping stroke in an embodiment of the invention in which a shaping head with crank drive is used and the lifting movement is generated by a lifting cam, the movement of the lifting cam being coupled to that of the stroke spindle. The tool path is shown in a projection onto the plane spanned by the stroke direction and the lifting direction and, more precisely, represents the path that the tip 4 of a working tooth of a shaping wheel 8 travels during an entire stroke.

The tool path runs through four sections A-B, B-C, C-D, and D-A, with the tool being positioned so as to abut against the roller-jointed toothing 2 in the working stroke A-B. In the region of the lower lifting (B-C), the tool is pulled back to the lifting position; in the upper lifting (D-A), it is returned or positioned so as to be in abutment. The return stroke (C-D) takes place in the lifted state of the tool.

The overflow path of the shaping stroke above and below the toothing, which overflow path is caused by the lifting region of the cam, is denoted in FIG. 1 with $O_{UB}$ and $O_{LB}$; an additional overflow path dependent on the shaping tool, which is caused by the machining clearance angle when shaping helical toothings with cutting wheels ground in step grinding, is indicated in FIG. 1 with $O_{LC}$ and $O_{LB}$. The so-called cutting length $S_{Cut}$ is thus the sum of the toothing width $b_2$ of the workpiece toothing 2 plus the upper and lower overflow of the shaping wheel 8, whereas the axial length of the lifting movement B-C is given due to the overflow of the lifting below and the axial extension of the return movement is given due to the overflow of the lifting above, as can be seen from FIG. 1. As can be seen from FIG.

1, the entire stroke length $S_{stk}$ is the sum of the upper and lower overflows of the lifting and the cutting length $S_{cut}$.

Figure 2:
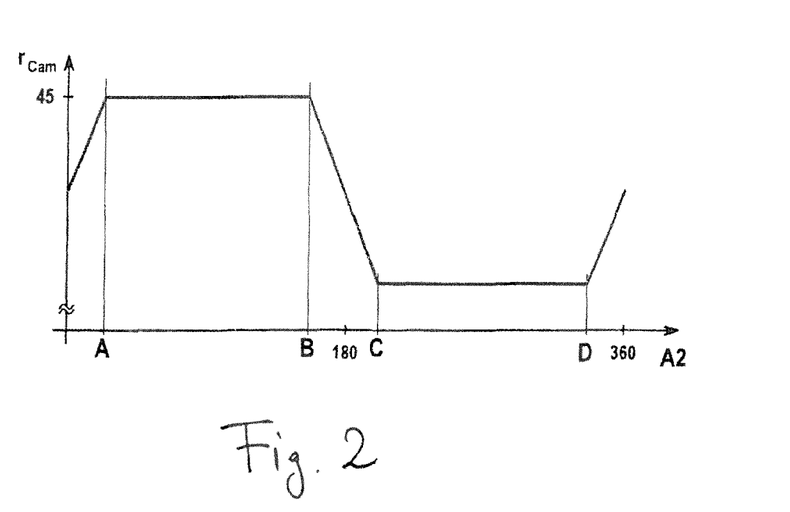

In FIG. 2, the profile of the lifting cam associated with the tool path of FIG. 1 is shown schematically (in fact, the transitions at A, B, C and D are designed for smooth movement). A constant radius of the lifting cam $r_{cam}$ can be recognized in the cutting region and a likewise constant region, but with a smaller radius in the return stroke region. However, the return stroke is not restricted to straight-line movements.

Figure 3:
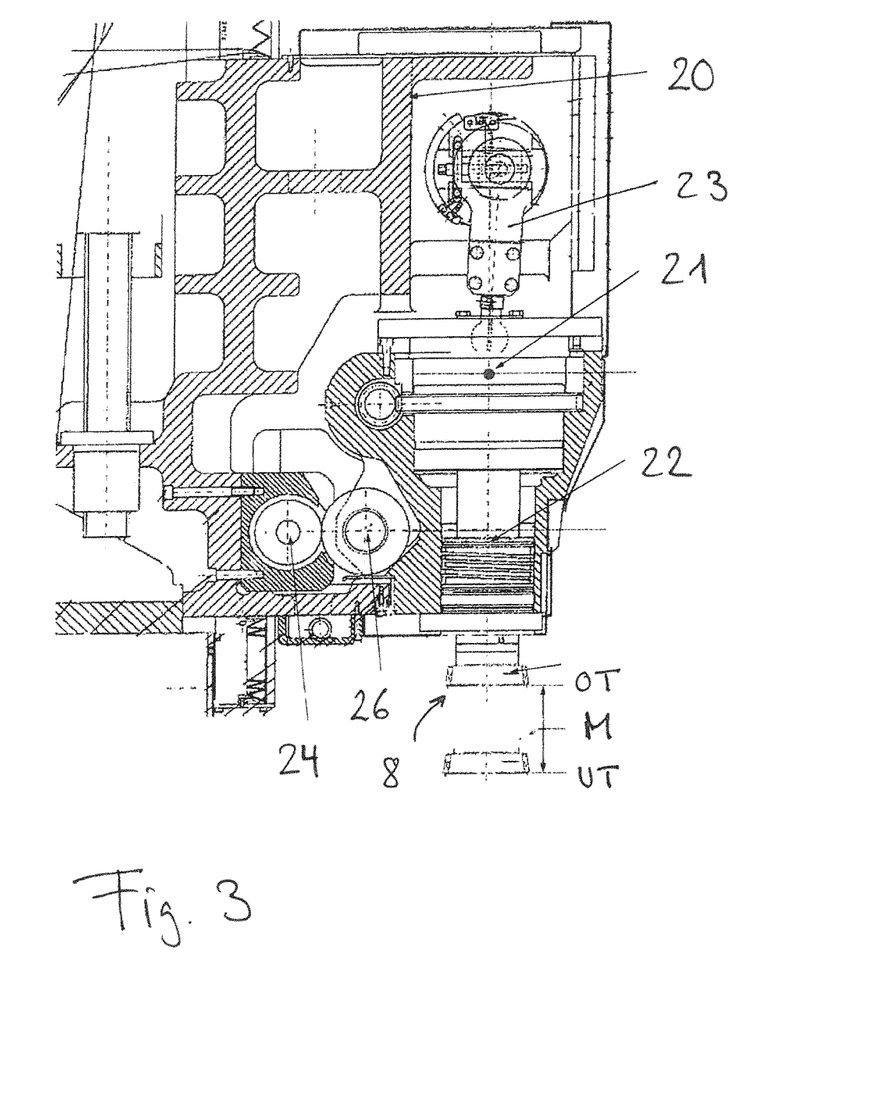
FIG. 3 is a partially torn sectional view of a shaping head with crank drive and lifting cam.

The tool path in the return stroke region C-D in FIG. 1 does not run parallel to the working stroke in this embodiment, but rather obliquely since the lifting in the case of a shaping head with a crank drive takes place via a tilting movement of the spindle guide. This can be seen better in FIG. 3, which shows a shaping head. In FIG. 3, the base frame of the shaping head is denoted by 20, the connecting rod by 23, the pivot point by 21 and the spindle guide by 22. The spindle guide is pushed forwards by the lifting cam 24 in contact with the pressure roller 26 during the cut and left behind during the return stroke. As a result of this tilting, the lifting amount of the tool is dependent on the stroke position; and the ratio of the lifting amount on the cutting wheel relative to the lifting on the cam is equal to the ratio from the difference of the distance from the center of the stroke M, between the upper dead center OT and the lower dead center UT, to the stroke position relative to the center of the stroke and the axial distance from the center of rotation of the lifting cam to the pivot point 21. In this way, the lifting amount can be influenced by the selected design of the shaping head.

The examples explained so far are primarily used in the machining of external toothings, but the invention also relates to the machining of internal toothings. For this purpose, as is known to a person skilled in the art, in the case of machining the internal toothing on the side facing the main column, an internal cam is used in which the lifting takes place in the opposite direction to the lifting cam described above. Alternatively, however, the internal toothing could also be machined on the side opposite the main column, so that the same conditions prevail as with the external toothing. It is also possible to reverse the coupling between the stroke spindle and the lifting cam axis of rotation when pushing the internal toothing with an external lifting cam on the side facing the main column, so that the cut takes place in the return stroke region of the lifting cam.

Although the lifting cam was previously used for shaping heads with a crank drive, the invention can also be used for different types of shaping heads, such as hydraulic shaping heads, in which the entire main column is retracted radially for lifting and the lifting amount can thus be freely selected.

In the following, the superimposed deflection movement is shown in an embodiment with reference to FIGS. 4 and 5, which in this embodiment is implemented by an additional rotation $\delta C8$ of the shaping tool 8 as a function of a change in stroke position $\delta A_z$ in the return stroke C-D.

For this purpose, the stroke movement $A_z$ is shown in isolation in FIG. 4a as a function of time, corresponding to the axial projection of the continuously traversed tool path from FIG. 1. You can see the cyclically repeating shaping strokes. In FIG. 4b below, the rotary position C8 of the shaping wheel is recorded, determined for example by a rotary encoder, which takes place in rolling contact. The curve shown in FIG. 4b results from a superimposition of a linear rise, which curve reproduces the superimposition of a rolling contact with an assumed straight toothing and thus the coupling of the tool rotation relative to the workpiece rotation that is slow compared to the frequency of the shaping strokes (a plurality of strokes per division) and which is superimposed by the electronic incline as explained at the outset. This is expressed in the vibration components in FIG. 4b that are adapted to the frequency of the stroke axis. In the working stroke A-B, the incline is compensated by tracking the tool rotation, in the return stroke C-D this has to be reversed again in order to be in the correct rolling contact again on the next working stroke.

In FIG. 4c, the stroke movement and the rotary position are plotted against each other. Without the linear component of the rolling contact from FIG. 4b, there would only be a single line that would be traversed in opposite directions in the return stroke and return stroke; due to the linear component of the rolling contact from FIG. 4b, it results in the relationship shown in FIG. 4c, in which relationship the track is distorted and due to the distortion by changing the C8 position for successive strokes it diverges like an accordion.

Figure 4:
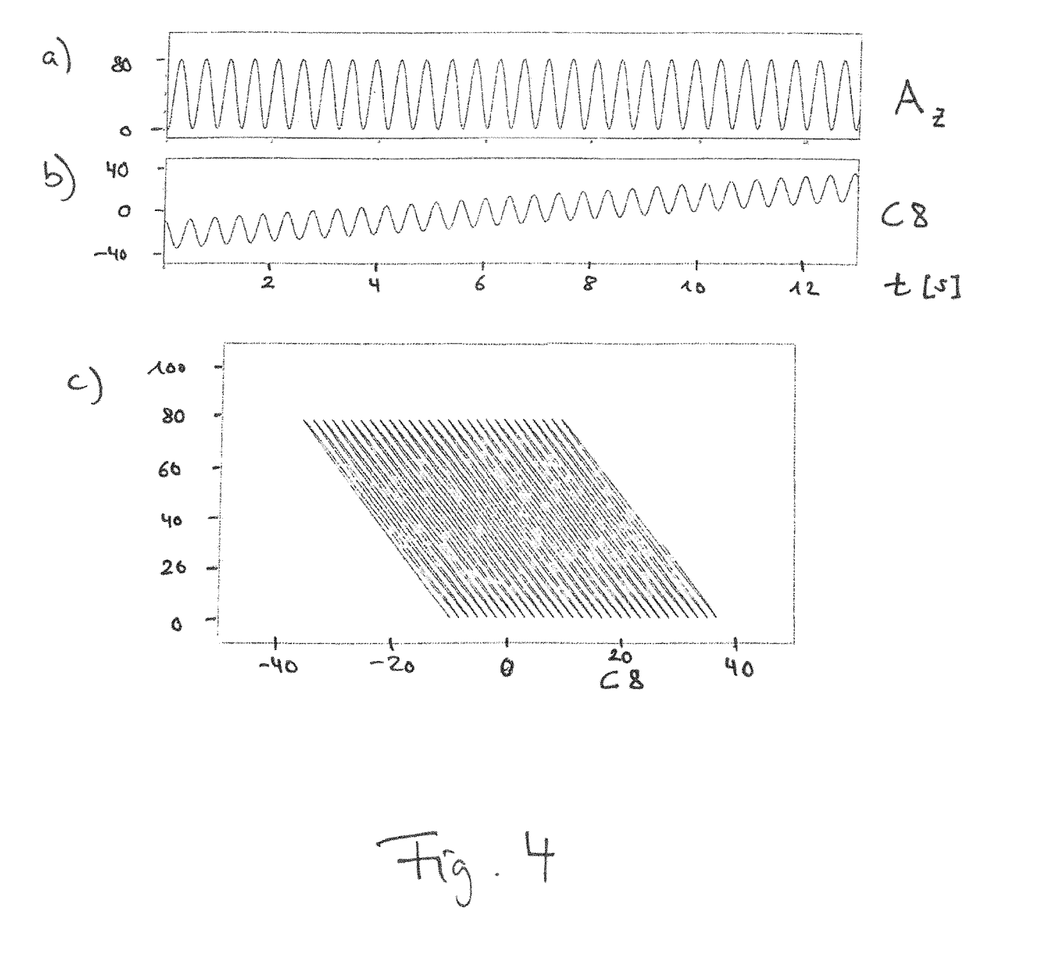
FIG. 4A shows a stroke position as a function of time.
FIG. 4B shows a rotational position as a function of time.
FIG. 4C shows a relationship between the rotary position and the stroke position.
Figure 5:
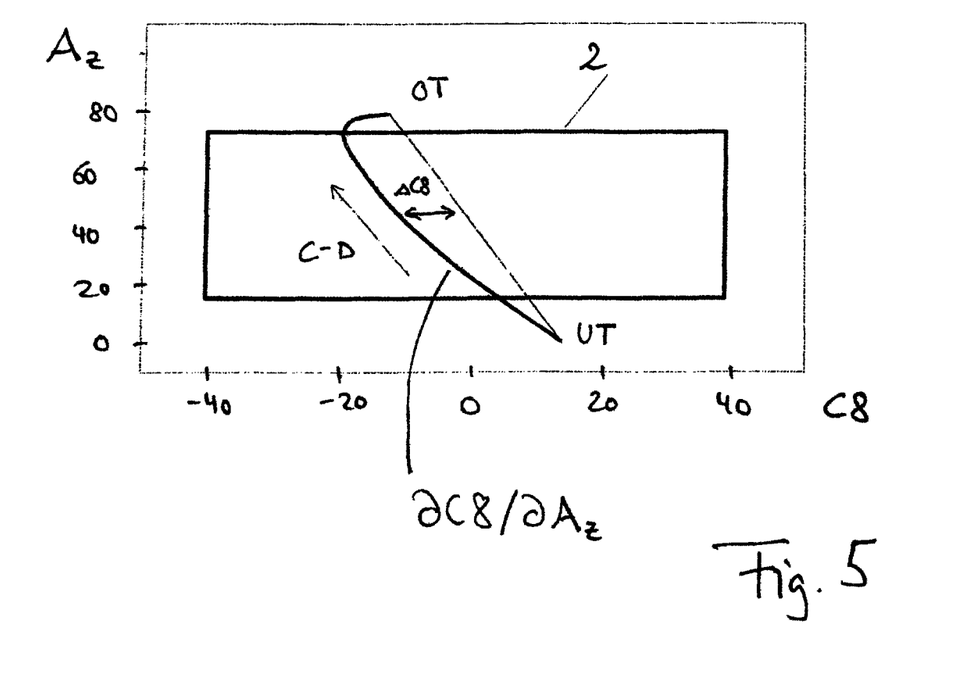
FIG. 5 shows a greatly exaggerated representation of a deflection movement in a rotary position/stroke position diagram.

The additional amount $\Delta C8$ superimposed on this illustrated movement is so small compared to the electronic incline that it cannot be seen in FIG. 4 and is therefore shown greatly exaggerated for a single return stroke in FIG. 5 (in fact, for typical applications, a change of the order of magnitude of 30 μm on the pitch circle of the tool 8 corresponds to a rotary position difference of 0.02° in the C8 axis). In FIG. 5, the straight line UT-OT denotes the relationship between stroke and tool rotation in the return stroke, and the strongly exaggerated curved path that deviates from the straight line denotes the rotary position changing relative to the straight line due to the additional rotation as a function of the stroke movement, $\delta C8/\delta A_z$. It can be seen that in the region of the return stroke, with the same stroke movement position, the rotary position increases steadily in relation to the straight path until a maximum is reached near the upper workpiece edge and, in the region of the upper overflow, the offset previously generated by the additional rotation is reset to zero by means of the reversal of the additional rotation.

As can be seen in particular from FIG. 5, this additional angle of rotation offset only builds up slowly in the return stroke, so that in any case a lower offset is generated in the region of the lower workpiece edge than in the region of the upper workpiece edge. In this way, a deflection takes place in the return stroke of the incoming flank of the workpiece toothing, but not suddenly to the maximum deflection position, so that a collision distance to the opposite flank, in particular in the region near the lower tooth edge of the workpiece toothing 2, remains small. As already explained above, this allows a design for overall lower (radial) lifting amounts, i.e. a smaller distance between the working stroke and return stroke paths in FIG. 1, and thus design options for lower-vibration design of gear shaping machines.

The machine axes of a gear shaping machine that can be used for this purpose are shown again with reference to FIG. 6 for an exemplary gear shaping machine 100 with a controller 99 for CNC control of the machine axes of the gear shaping machine 100.

Figure 6:
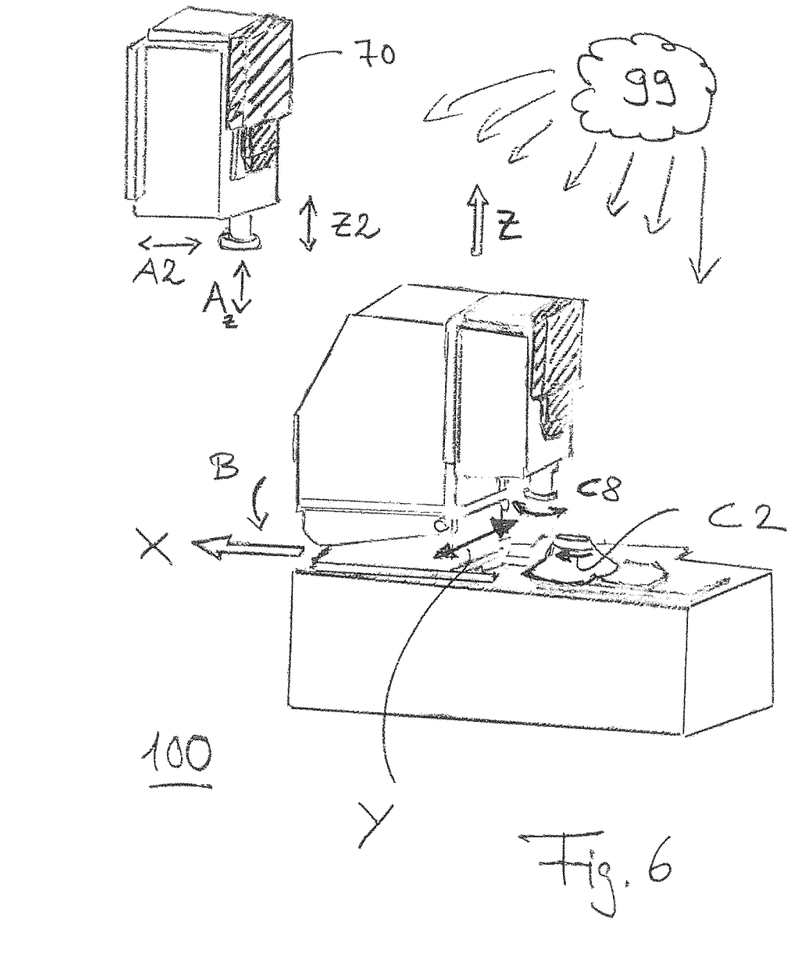
FIG. 6 is a schematic view of a gear shaping machine with its NC machine axes.

The standard NC axes of the gear shaping machine 100 shown in FIG. 6 are the radial axis X used for infeed, the axis Z for the stroke position, the axis C2 for the workpiece rotation, the axis C8 for the tool rotation, the axis $A_z$ for the stroke movement the shaping spindle, and the axis A2 for the cam rotation/lifting in the case of a preferred embodiment of the gear shaping machine 100 with lifting cams. Furthermore, additional NC axes can be provided individually or in combination, such as the axis Z2 for the stroke length adjustment, an axis B for an adjustable column inclination, and a tangential axis Y for a column side offset, in order to be able to carry out off-center gear shaping. The direct drive 70 of the axis of rotation C8 is also shown on the shaping head.

In addition, the invention is not restricted to the embodiments shown on the basis of the figures. Rather, the individual features of the above description and the following claims may be essential, individually and in combination, for implementing the invention in its different embodiments.

The invention claimed is:

1. A method for gear shaping a periodic structure comprising a toothing (2) on a workpiece, said method comprising:
    rotating the workpiece about a workpiece axis of rotation (C2),
    rotating a toothed gear shaping tool (8) about a tool axis of rotation (C8),
    bringing the workpiece and the shaping tool into material-removing machining engagement with one another wherein the rotating workpiece and the rotating shaping tool are in rolling contact with one another,
    removing material from the workpiece via a working stroke (A-B) of the shaping tool relative to the workpiece,
    lifting off the shaping tool from the workpiece (B-C) in a lifting direction (A2) by a maximum lifting amount,
    once the shaping tool has been lifted off of the workpiece by the maximum lifting amount, performing a return stroke (C-D) of the shaping tool relative to the workpiece,
    positioning the shaping tool relative to the workpiece (D-A) for a next working stroke,
    wherein during the return stroke, a deflection movement ($\delta C8/\delta A_z$) of the shaping tool is superimposed on the rotation of the shaping tool, an amount of said deflection movement changing during the return stroke, and said deflection movement running transversely to the lifting direction (A2) of the shaping tool and away from an incoming flank of the rotating workpiece for said next working stroke.

2. Method according to claim 1, in which the deflection movement is a rotational movement ($\Delta C8$) of the gear shaping tool that is superimposed on the rotating gear shaping tool.

3. Method according to claim 2, in which the deflection movement is carried out over all of the return stroke (C-D).

4. Method according to claim 1 in which the deflection movement is carried out over all of the return stroke (C-D).

5. Method according to claim 1 in which the deflection movement creates an offset of the shaping tool with respect to a reference straight line representing the relationship between return stroke and tool rotation without said offset, said offset steadily building up during the return stroke.

6. Method according to claim 5, in which a maximum offset lies closer to the end (D) of the return stroke than to the beginning (C) of the return stroke.

7. The method of claim 5 wherein said offset comprises an offset ($\Delta C8$) of a rotational position of the toothed gear shaping tool with respect to a rotational position of the toothed gear shaping tool during the rolling contact.

8. Method according to claim 1 in which the deflection movement is controlled in accordance with a ratio of the closest distance between the workpiece toothing (2) and the shaping tool (8), said ratio being in the interval [1/8; 8] of the closest distance between the workpiece toothing (2) and the shaping tool (8) with respect to the incoming workpiece flank relative to the closest distance between the workpiece toothing (2) and the shaping tool (8) with respect to an opposite workpiece flank.

9. The method of claim 8 wherein said ratio is in the interval [1/5; 5].

10. The method of claim 9 wherein said ratio is in the interval [1/3; 3].

11. Method according to claim 1 in which a plurality of working strokes and return strokes are carried out per division of the workpiece toothing (2).

12. Method according to claim 1 in which the return stroke is accelerated compared to the working stroke.

13. Method according to claim 1 in which a tool path (A-B-C-D) defined by the working stroke (A-B) of the shaping tool relative to the workpiece, the lifting off the shaping tool from the workpiece (B-C), the return stroke (C-D) of the shaping tool relative to the workpiece, and the positioning the shaping tool relative to the workpiece (D-A) for a next working stroke, is determined by means of a lifting cam (24), and wherein the shaping head is provided with a crank drive.

14. Gear shaping machine (100), comprising:
    a lifting cam (24) in a shaping head, the shaping head being provided with a crank drive,
    a controller (99), the controller being programmed to cause the gear shaping machine to perform the method set forth in claim 1, and
    the shaping head being provided with the toothed gear shaping tool.

* * * * *